United States Patent [19]

Vork et al.

[11] 4,019,395
[45] Apr. 26, 1977

[54] PISTON DRIVE ASSEMBLY

[75] Inventors: William D. Vork, Edina; William Clements, Deephaven, both of Minn.

[73] Assignee: Graco Inc., Minneapolis, Minn.

[22] Filed: July 7, 1975

[21] Appl. No.: 593,449

[52] U.S. Cl. .................................... 74/49; 92/72
[51] Int. Cl.² .................................... F16H 21/18
[58] Field of Search ............... 74/49, 25; 417/388, 417/383; 60/539, 594; 92/72

[56] References Cited

UNITED STATES PATENTS

| | | | |
|---|---|---|---|
| 1,663,927 | 3/1928 | Voreaux | 74/49 |
| 2,055,046 | 9/1936 | Phillips et al. | 417/536 |
| 2,064,750 | 12/1936 | Hurst | 417/214 |
| 2,219,002 | 10/1940 | Beeh | 417/273 |
| 2,437,738 | 3/1948 | Hanggi | 74/49 X |
| 2,622,444 | 12/1952 | Waldvogel | 74/49 X |
| 2,678,005 | 5/1954 | Messick | 417/523 |
| 2,770,972 | 11/1956 | Gratzmuller | 74/49 |
| 3,118,381 | 1/1964 | Keil | 417/214 |
| 3,195,420 | 7/1965 | Johannsen | 92/74 |
| 3,259,076 | 7/1966 | Halberg et al. | 74/49 |
| 3,288,080 | 11/1966 | Madej | 417/571 |
| 3,320,902 | 5/1967 | Paschke | 417/510 |

Primary Examiner—Edgar W. Geoghegan
Attorney, Agent, or Firm—Paul L. Sjoquist

[57] ABSTRACT

Apparatus is disclosed for translating rotary motion into reciprocating motion, of the type utilized in piston operated pumps. The apparatus includes a crank shaft having one or more axially offset diameter segments, each segment having a block bearing partially encircling it, and the block bearing having a raised shoulder for mating with a piston surface groove. The piston is spring biased so as to hold the assembly comprising the piston, block bearing, and offset diameter segment together in a unitary assembly, so that rotation of the shaft causes the piston to reciprocate.

13 Claims, 4 Drawing Figures

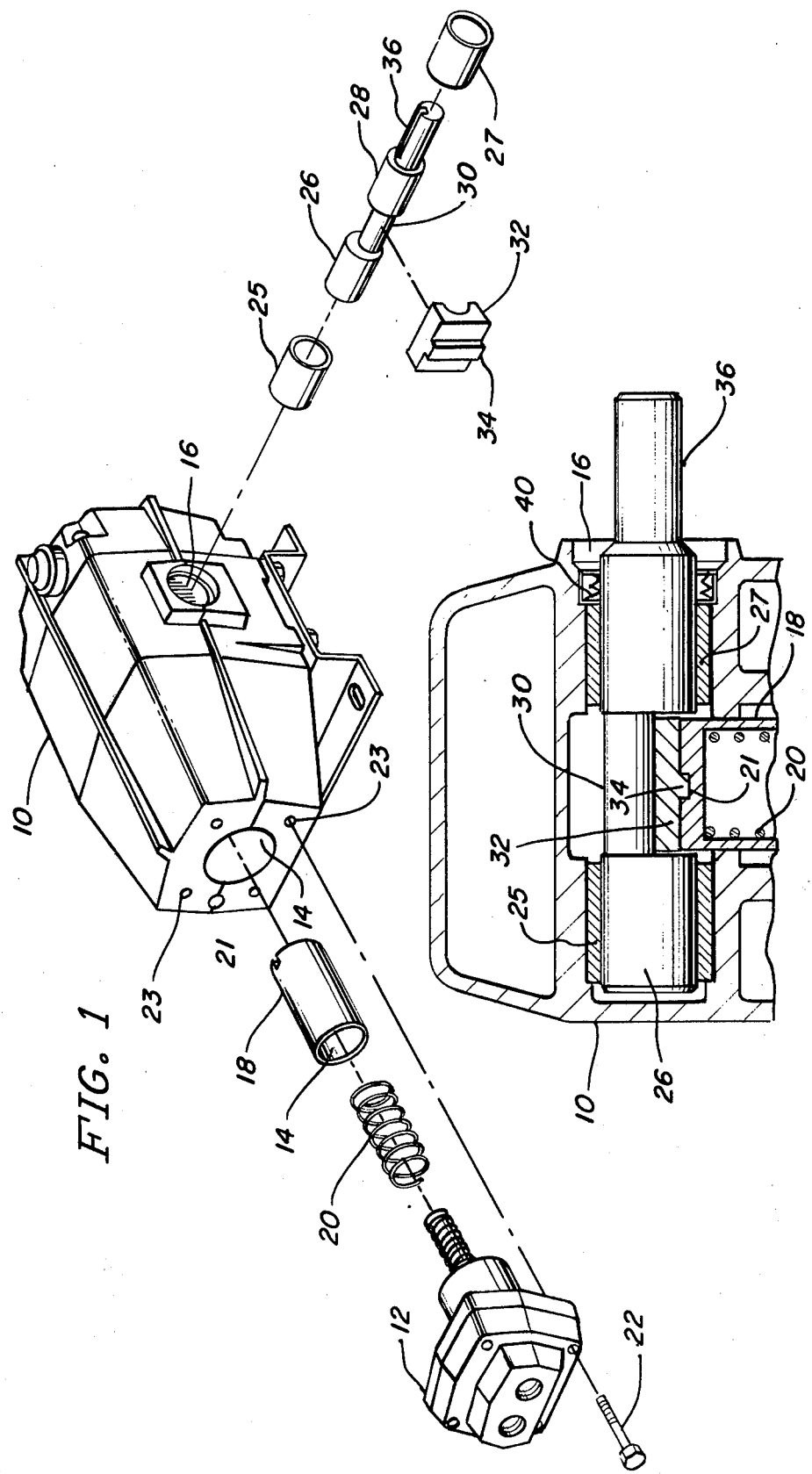

PISTON DRIVE ASSEMBLY

CROSS REFERENCE TO RELATED APPLICATION

The apparatus of this invention is related to the co-pending U.S. application serial No. 582,262, filed May 30, 1975, and entitled "Pressure Unloading Apparatus." The present invention provides the reciprocating drive source for the pump apparatus disclosed in the co-pending application.

BACKGROUND OF THE INVENTION

Reciprocating pumps are widely used for the transfer of fluids because they have a high pumping efficiency and can be readily connected to an appropriate power source. While many pumps of this type are operated for a reciprocating power source such as an air motor, a great many are also operated from rotary power sources. This last class of reciprocating pumps typically utilizes a conventional crank shaft and connecting rod arrangement to reciprocate a piston, for this is an old and proven power translational device. The piston is either in direct contact with the fluid to be pumped or, as is the case with the preferred embodiment of the present invention, may be isolated from the fluid to be pumped by means of an intermediate diaphragm. In this case, the reciprocating piston moves a hydraulic fluid which forces the diaphragm to reciprocate, and the diaphragm moves the fluid to be pumped through a suitable check valve system. The stroke of the piston in a typical diaphragm pump arrangement can be very short, on the order of one-half inch or less, but the rate of reciprocation may be as high as several thousand strokes per minute. The reciprocating drive mechanism for such pumping requirements in the past have included a wobble plate drive mechanism such as is described in U.S. Pat. No. 3,775,030, issued Nov. 27, 1973, Wanner; a rotating eccentric driving a ball bearing assembly such as described in U.S. Pat. No. 2,678,005, issued May 11, 1954, Messick; or a cam operated rod such as is described in U.S. Pat. No. 2,064,750, issued Dec. 15, 1936, Hurst.

SUMMARY OF THE INVENTION

The present invention comprises a rotating shaft having one or more offset diameter segments formed as a part thereof, the shaft being rotatable within a housing by means of journal bearings. A bearing block or shoe is nested over the respective offset segments, and the bearing block has a raised shoulder over its outer surface. A reciprocating piston having a mating grooved surface is nested over the bearing block and is held against the bearing block by means of a compression spring.

A feature of the present invention, aside from its novel construction features, is the ease and simplicity with which it can be assembled in a pump housing. Since none of the functional components are fastened together in any way, the drive mechanism is assembled by merely inserting the appropriate components to the pump housing in proper contacting relationship. The pumping chamber assembly is then bolted over the piston and compression spring to enable the completed pump to be ready for use.

BRIEF DESCRIPTION OF THE DRAWINGS

FIG. 1 illustrates in perspective and expanded view the components of the invention;

FIG. 2 illustrates in cross sectional view the assembled components;

DESCRIPTION OF THE PREFERRED EMBODIMENT

Figure 4:
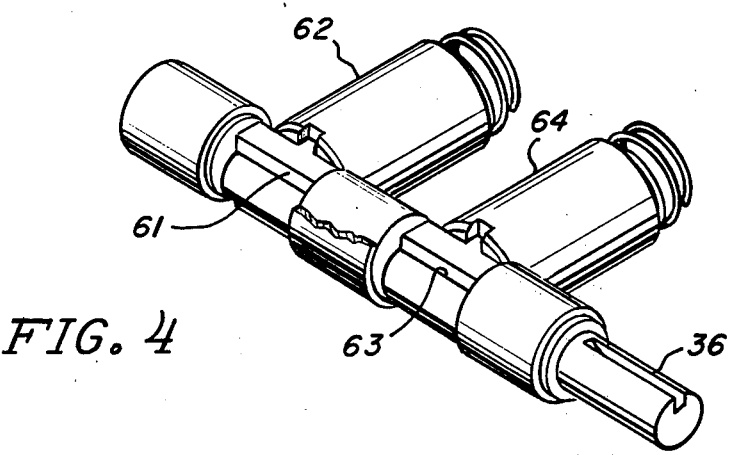
FIG. 4 illustrates an embodiment of the invention having two piston assemblies.

Referring first to FIG. 1, the invention is shown in perspective and expanded view. A pump housing 10 has an internal machined cylinder bore 14 and a similarly machined crank shaft passage 16 formed at perpendicular angles with respect to one another. Cylinder bore 14 accepts piston 18 which has an outer machined surface of slightly smaller diameter than the internal diameter of cylinder bore 14. Compression spring 20 fits inside of recess 19 within piston 18. A pumping chamber assembly 12 then fits partially inside of compression spring 20 and may be bolted to housing 10 by means of bolts 22 being threaded into threaded holes 23. A detailed description of one embodiment of a pumping chamber assembly 12 may be found in co-pending U.S. patent application Ser. No. 582,262, filed May 20, 1975, and assigned to the common assignee of the present invention.

Crank shaft passage 16 is sized to accept journal bearing 25 which fits in a bearing relationship over shaft bearing surface 26. A similar journal bearing 27 fits over shaft bearing surface 28. An intermediate offset diameter segment 30 forms the eccentric drive shaft of the present invention. The block bearing 32 has a bearing surface mated to offset segment 30 and also has a raised shoulder 34. Raised shoulder 34 mates with piston groove 21 for bearing contact therewith.

The expanded view of FIG. 1 illustrates the relative mating relationship between block bearing 32 and offset segment 30. In an actual assembly operation, however, block bearing 32 is inserted through cylinder bore 14 prior to the insertion of piston 18. Journal bearings 25 and 27 are press fit into housing 10, passage 16, and keyed drive shaft 36 is inserted through crank shaft passage 16. The preferred assembly operational steps are as follows:

1. Journal bearings 25 and 27 are fitted into passage 16;
2. Drive shaft 36 is inserted into journal bearings 25 and 27;
3. Block bearing 32 is inserted through cylinder bore 14 and is seated against offset segment 30;
4. Piston 18 is inserted into cylinder bore 14 and groove 21 is aligned with raised shoulder 34;
5. Compression spring 20 is inserted into recess 19;
6. Pumping chamber assembly 12 is inserted into cylinder bore 14; and
7. Bolts 22 are threaded into threaded holes 23 to fasten pumping chamber assembly 12 to housing 10.

A final step may include the insertion of an appropriate seal 40 (see FIG. 2) over outermost most portion of bearing surface 28 to prevent oil leakage from housing 10.

FIG. 2 illustrates the apparatus in cross section view and in assembled configuration. Journal bearing 25 is press fitted into housing 10 and in sliding relationship to bearing surface 26 on shaft 36. Similarly, journal bearing 27 is press fitted into housing 10 and in sliding relationship to bearing surface 28. An oil seal 40 is illustrated between bearing surface 28 and housing 10 in a conventional oil sealing arrangement. Block bearing 32 is seated against offset segment 30, and between the respective shaft bearing portions 26 and 28. Raised shoulder 34 is mated into piston groove 21. Piston 18 is held against block bearing 32 by means of compression spring 20.

It can be seen that the relative longitudinal position of shaft 36 is controlled by the mating components of the apparatus. In other words, piston 18 is positioned within cylinder 14; groove 21 then sets the position for shoulder 34; this in turn positions block bearing 32; block bearing 32, being nested between bearing surfaces 26 and 28 therefore sets the position of shaft 36. Block bearing 32 therefore serves the triple purpose of aligning shaft 36 in crank shaft passage 16, providing a bearing against offset segment 30, and providing a driving the link to the piston 18.

Figure 3:
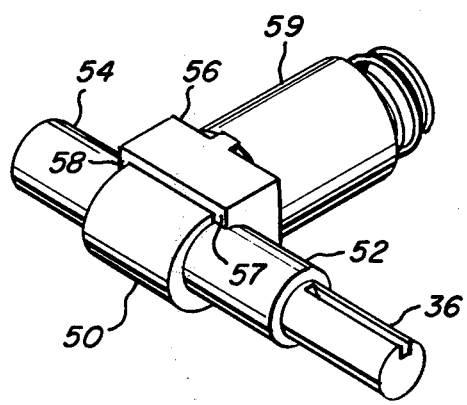
FIG. 3 illustrates an alternative embodiment of the invention.

FIG. 3 illustrates an alternative embodiment of the present invention. An offset segment 50 is sized larger than the adjacent bearing surfaces 52 and 54. Bearing block 56 mates against offset segment 50 as hereinbefore described, but has a shoulder 57 and a second shoulder 58 which ride over the outside edges of segment 50. The portion of bearing block 56 which extends beyond segment 50 has a mating bearing surface for contacting surfaces 52 and 54, respectively. Piston 59 mates against bearing block 56 in the manner hereinbefore described. In this embodiment the assembly procedure must be varied to accommodate the oversized segment 50. Passage 16 in housing 10 must be sized large enough to accept segment 50, and the order of installation of the journal bearings and shaft 36 is modified as follows:

1. Press fit journal bearing 25 into housing 10;
2. Insert shaft 36 into passage 16 and bearing surface 54 through journal bearing 25; and
3. Press fit journal bearing 27 into housing 10 and over bearing surface 52.

FIG. 4 illustrates an alternative embodiment of the invention having two offset segments and bearing blocks 61 and 63, for driving two pistons 62 and 64, respectively. The offset segments may be arranged so that pistons 62 and 64 reciprocate either in unison or alternately. Another alternative embodiment (not shown) is to arrange two pistons in diametric opposition on the same offset segment. In this embodiment the pistons reciprocate in horizontal opposition to one another, being driven from the same offset segment. Yet another alternative embodiment (not shown) is to arrange two pistons over two offset segments in cylinders that are either in horizontal opposition to one another or are arranged at some relative angular position other than parallel. In any embodiment having two or more offset segments it is preferable to add an intermediate journal bearing for shaft support. Other variations and alternative embodiments may be constructed from the novel elements disclosed herein.

In operation a suitable rotary power source is connected to shaft 36. Constant speed electric motors are adequate for this power source function, but other rotary power sources may also be used. When the power source is energized, shaft 36 rotates in its journal bearings. Because the offset diameter segment is so constructed it rotates around a circular path axially aligned with shaft rotation but axially displaced therefrom.

The bearing block is constrained against the offset diameter segment and it therefore rotates around the same circular path. The bearing block is also constrained by the tongue and groove mating surfaces with the piston, forcing the piston to move back and forth as the relative bearing block piston axial direction changes. However, since the piston is constrained by the cylinder bore to a single axial plane of movement it translates bearing block rotation into only its components along the cylinder bore axis. The result is that the bearing block slides along the piston bearing surface during the motion of its rotational cycle that is transverse to the cylinder bore axis and it moves the piston during the motion of its rotational cycle that is axially aligned with the cylinder bore axis. In this manner the rotational motion of the bearing block is translated into reciprocating motion of the piston.

It is apparent that the novel reciprocating drive motion, and apparatus from which it is derived, may be used in any mechanical application requiring such reciprocating motion from a rotary drive source. The preferred embodiments described herein are illustrative of specific applications wherein the apparatus has particular utility.

What is claimed is:

1. Apparatus for providing a reciprocating drive motion for a rotating shaft mounted in a housing, comprising:
   a. a portion of said shaft having an axially offset segment of predetermined diameter;
   b. a cylinder passage in said housing in perpendicular alignment with said axially offset segment;
   c. a bearing block having a bearing surface mating and partially encompassing said axially offset segment, and having an outer bearing surface with a guide member aligned transverse said shaft axial direction;
   d. a piston in said cylinder passage having a bearing surface contacting said bearing block outer bearing surface; and
   e. a compression spring contacting said piston and said housing and urging said piston toward said bearing block outer bearing surface.

2. The apparatus of claim 1 wherein said bearing block guide member and said piston bearing surface further comprise a tongue and groove mating portion.

3. The apparatus of claim 2 wherein said bearing block outer bearing surface is substantially flat except for said guide member portion.

4. The apparatus of claim 3 wherein said axially offset segment of said shaft has a diameter less than the shaft diameter.

5. The apparatus of claim 4 wherein said bearing block has an axial length slightly shorter than the length of said axially offset segment of said shaft.

6. A reciprocating drive apparatus for installing in a housing having a first shaft hole drilled therein and having a second cylinder bore perpendicularly aligned and joining said shaft hole, comprising:
   a. a shaft of diameter less than said shaft hole and having an axially offset diameter segment;
   b. at least two journal bearings having an outer diameter sized to fit in said shaft hole and having an inner diameter slightly larger than said shaft diameter;
   c. a bearing block sized to fit through said cylinder bore, and having a first bearing surface partially mating said axially offset diameter segment surface, and having a second bearing surface with a raised shoulder extending transverse said shaft axis;

d. a piston sized to fit in said cylinder bore, and having a bearing surface including a mating groove for contacting said bearing block raised shoulder; and e. spring means for forcing said piston against said bearing block.

7. The apparatus of claim 6 wherein said bearing block has an axial length of slightly less than said axially offset diameter segment length.

8. The apparatus of claim 7 wherein the diameter of said axially offset segment is less than the diameter of said shaft.

9. An apparatus for providing a reciprocating drive motion from a rotating shaft in a housing, comprising:

a. at least one axially offset diameter segment on said shaft;

b. a bearing block for each of said offset diameter segments, said bearing block having an internal bearing surface mated to said offset diameter segment, and having an external bearing surface with a raised shoulder extending transverse said shaft axial direction;

c. a piston associated with each of said bearing blocks, said piston having a bearing surface contacting said bearing block external bearing surface, and including a groove mating said raised shoulder; and d. spring means, associated with each of said pistons, for urging said piston against said bearing block.

10. The apparatus of claim 9 wherein said axially offset segment on said shaft is of diameter less than said shaft.

11. The apparatus of claim 10, wherein said bearing block has an axial length slightly less than the length of said axially offset segment.

12. The apparatus of claim 9, wherein said axially offset segment on said shaft is of diameter larger than said shaft.

13. The apparatus of claim 12, wherein said bearing block has an axial length longer than the length of said axially offset segment, and further has a lip extending over each of the two edges of said axially offset segment.

* * * * *